United States Patent [19]

Tiramani

[11] Patent Number: 5,566,959
[45] Date of Patent: Oct. 22, 1996

[54] UNITARY MOLDED SINGLE BLADE SKI-SLED

[75] Inventor: Paolo M. B. Tiramani, Greenwich, Conn.

[73] Assignee: Snowblade Corporation, Franklin Lakes, N.J.

[21] Appl. No.: 190,338

[22] Filed: Feb. 1, 1994

[51] Int. Cl.$^6$ .............................. B62B 13/00; B62B 13/04
[52] U.S. Cl. ........................................ 280/28.14; 280/21.1
[58] Field of Search ......................... 280/28, 28.14, 280/21.1, 14.3, 14.1, 606, 609, 610

[56] References Cited

U.S. PATENT DOCUMENTS

| | | | |
|---|---|---|---|
| D. 93,132 | 8/1934 | Richards . | |
| D. 157,137 | 2/1950 | Foster | D34/15 |
| D. 162,423 | 3/1951 | Kotchan | D34/15 |
| D. 178,325 | 7/1956 | Nelson | D34/15 |
| D. 184,499 | 2/1959 | Van Slooten | 280/28.14 |
| D. 202,055 | 8/1965 | Kaup | D34/15 |
| D. 205,296 | 7/1966 | Cohen | D34/15 |
| D. 232,164 | 7/1974 | Bemis et al. | D21/2 |
| D. 291,427 | 8/1987 | Schaller et al. | D12/10 |
| D. 303,416 | 9/1989 | Strauss | D21/229 |
| 307,730 | 11/1884 | Proctor . | |
| 768,977 | 8/1904 | Clark et al. . | |
| 1,026,023 | 5/1912 | Diener et al. . | |
| 1,349,645 | 8/1920 | Yerkes | 280/21.1 |
| 1,506,243 | 1/1924 | Kieft et al. | 280/606 |
| 1,569,885 | 1/1926 | Robblee . | |
| 1,655,713 | 1/1928 | Scoville . | |
| 1,672,782 | 6/1928 | Ring . | |
| 1,954,830 | 4/1934 | Richards | 188/8 |
| 2,443,348 | 6/1948 | Flajole | 280/12 |
| 2,447,700 | 8/1948 | Hassman | 280/12 |
| 2,460,815 | 2/1949 | Dunkel | 280/23 |
| 2,841,406 | 7/1958 | Brandon | 280/12 |
| 2,963,299 | 12/1960 | Smith | 280/25 |
| 3,026,120 | 3/1962 | Guerard | 280/12 |
| 3,139,287 | 6/1964 | Annis | 280/12 |
| 3,190,668 | 6/1965 | Husak | 280/12 |
| 3,297,334 | 1/1967 | Jenks | 280/12 |
| 3,301,569 | 1/1967 | Broschart | 280/25 |
| 3,319,971 | 5/1967 | Thomas et al. | 280/28 |
| 3,325,179 | 6/1967 | Bissett | 280/25 |
| 3,336,038 | 8/1967 | Cohen | 280/12 |
| 3,545,785 | 12/1970 | Brenter | 280/21.1 |
| 3,617,070 | 11/1971 | Roberts | 280/21 |
| 3,666,281 | 5/1972 | Billings | 280/12 |
| 3,744,811 | 7/1973 | Johnston | 280/12 |
| 3,782,745 | 1/1974 | Stoveken | 280/18 |
| 3,830,513 | 8/1974 | Hunt | 280/12 |
| 3,885,803 | 5/1975 | Christian | 280/28.14 |
| 3,917,301 | 11/1975 | Fabris | 280/12 |
| 4,082,304 | 4/1978 | Kendrena | 280/12 |
| 4,129,313 | 12/1978 | Benson | 280/12 |
| 4,193,609 | 3/1980 | Bissett | 280/28.14 |
| 4,199,162 | 4/1980 | Joy | 280/12 |
| 4,262,927 | 4/1981 | Hochstrasser | 280/609 |
| 4,310,169 | 1/1982 | Brough | 280/12 |
| 4,324,409 | 4/1982 | Larsen et al. | 280/14.1 |
| 4,349,208 | 9/1982 | Merrill | 280/12 |
| 4,349,209 | 9/1982 | Chilzer | 280/28.14 |
| 4,533,150 | 8/1985 | Hardy | 280/609 |
| 4,650,198 | 3/1987 | Sherretts | 280/28.14 |
| 4,720,280 | 1/1988 | Hufnagi et al. | 441/74 |
| 4,722,539 | 2/1988 | Molinaro | 280/12 |
| 4,886,283 | 12/1989 | Wells | 280/14.1 |
| 4,951,960 | 8/1990 | Sadler | 280/606 |
| 4,961,592 | 10/1990 | Diard et al. | 280/609 |

FOREIGN PATENT DOCUMENTS

| | | | |
|---|---|---|---|
| 13825 | 10/1990 | Finland . | |
| 538932 | 12/1976 | U.S.S.R. | 280/28.14 |

Primary Examiner—Margaret A. Focarino
Assistant Examiner—Min Yu
Attorney, Agent, or Firm—Paul J. Juettner

[57] ABSTRACT

A single runner ski-sled is provided wherein the main structure is adapted for one piece molding techniques with sufficient strength for effective use. The runner is designed to be rigid. The device of the invention also includes a seat attachment structure that allows for easy installation and removal yet can withstand strong pressures.

13 Claims, 4 Drawing Sheets

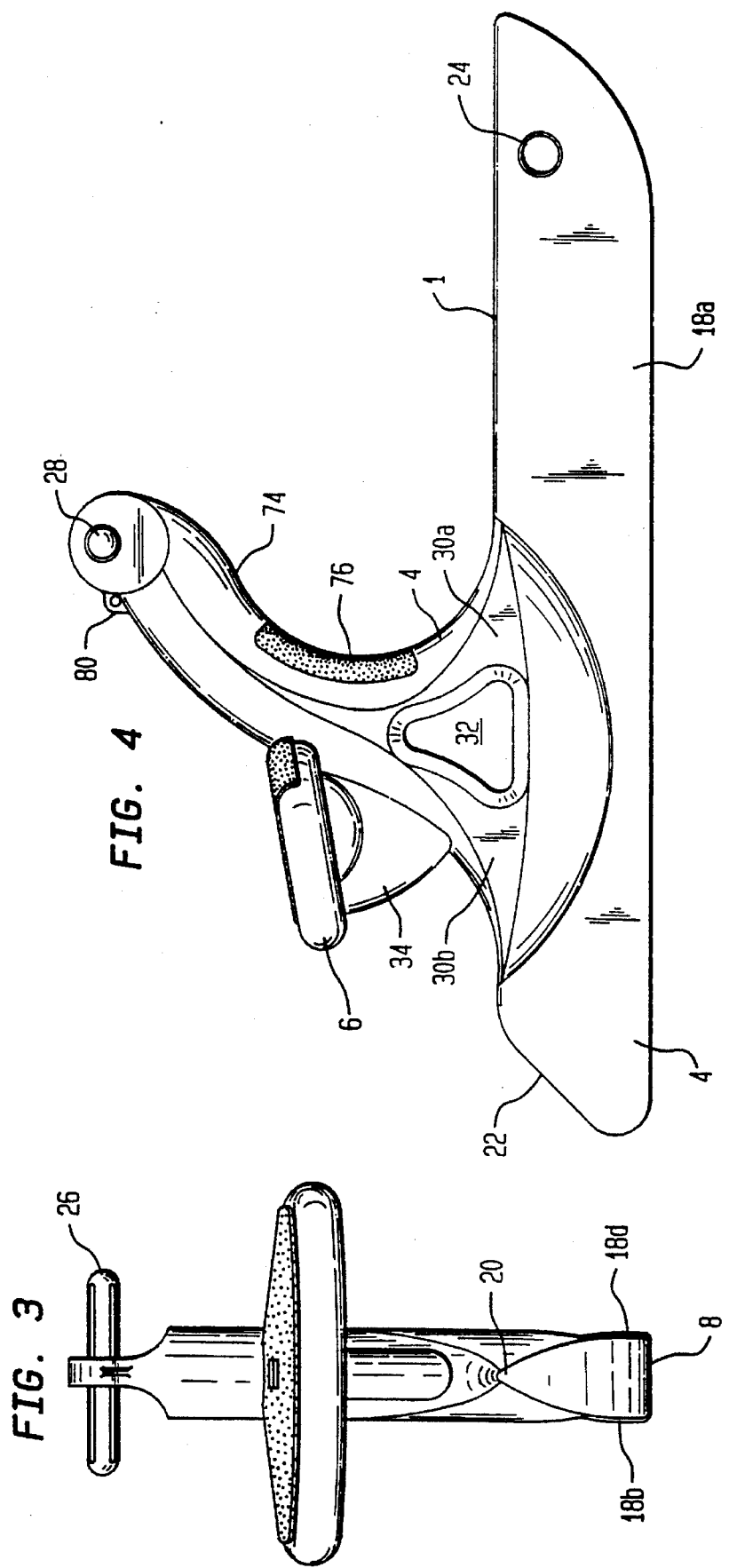

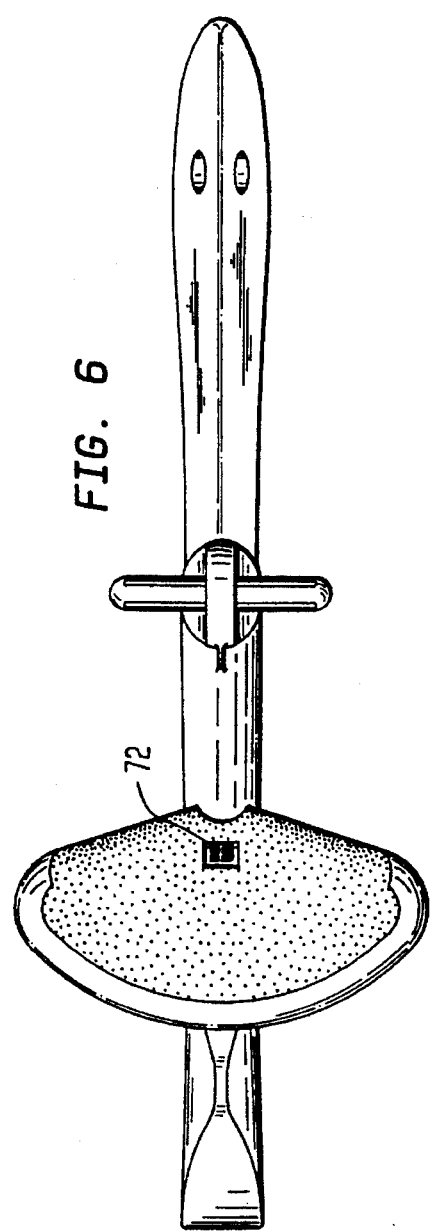
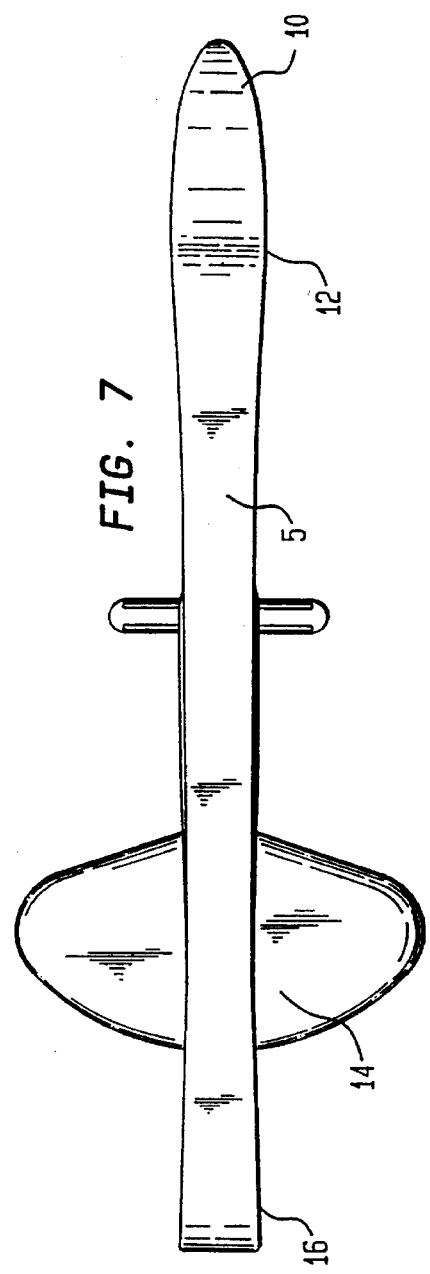
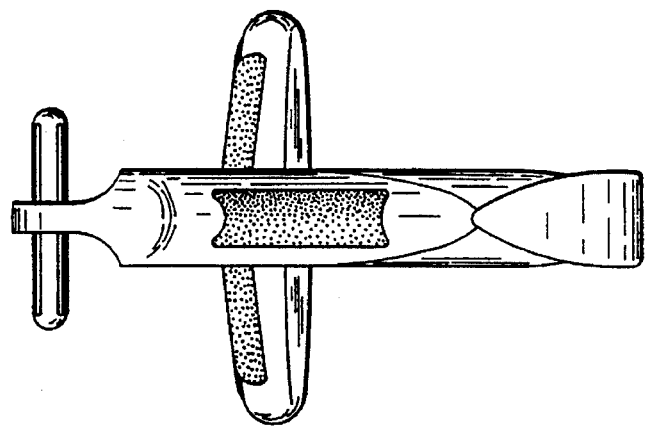

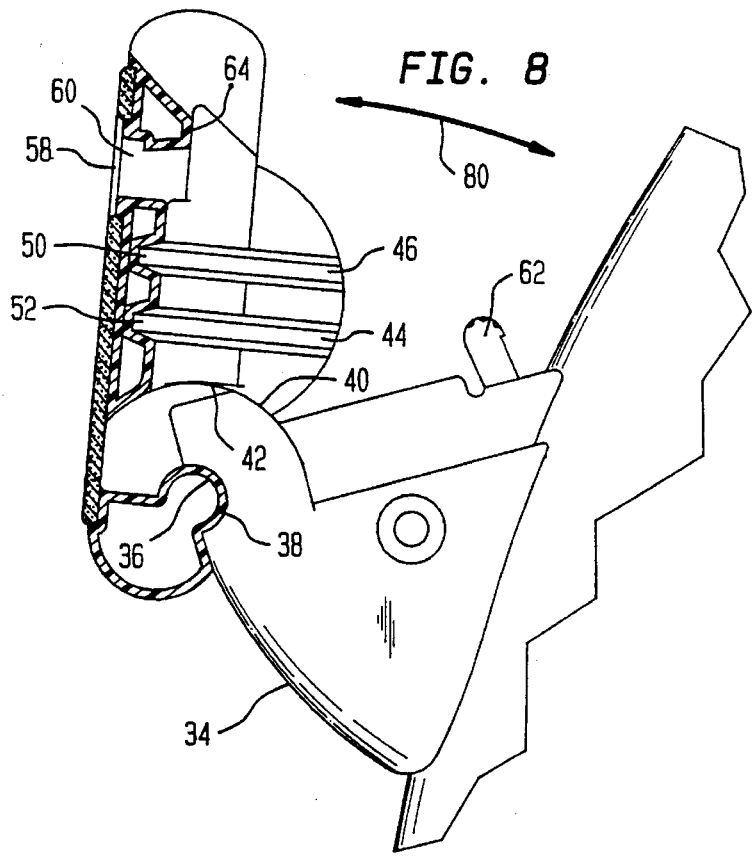
FIG. 8
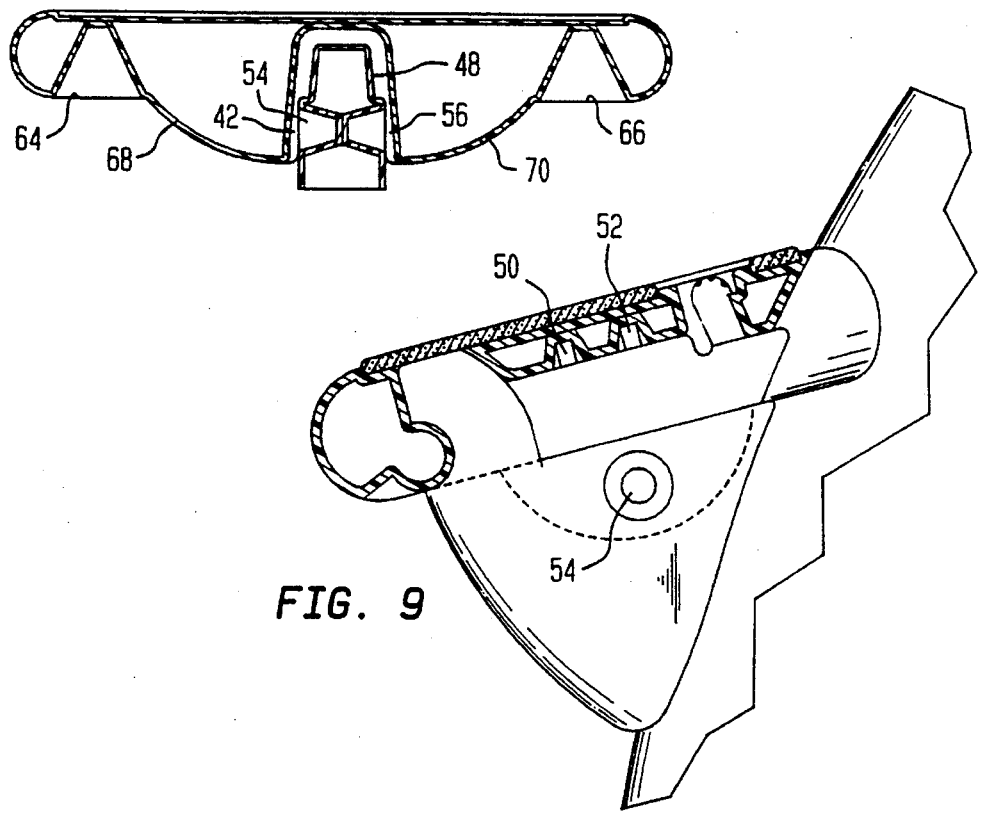
FIG. 10
FIG. 9

5,566,959

UNITARY MOLDED SINGLE BLADE SKI-SLED

BACKGROUND OF THE INVENTION

1. Field of the Invention

The invention relates to a single runner ski-sled device in which the user sits on a seat means supported above the runner on a column or pedestal which is capable of unitary construction and of being blow molded.

2. Description of the Prior Art

Single runner ski-sleds are well known devices and a variety of configurations have been suggested. In general, the user sits upon a seat supported by a column above a single ski and controls the direction and speed of the device by weight control and extending legs on opposite sides of the runner and selectively engaging his feet with the surface of the snow. Generally, the runner resembles a ski, hence the name ski-sled.

Typical of such ski-sleds are the devices disclosed in U.S. Pat. Nos.:

Des. 93,132

Des. 157,137

Des. 202,055

Des. 205,296

Des. 291,427

Des. 303,416

4,722,539

Finish 13,825

In general, each of the devices disclosed in these citations resembles a ski, i.e., a flat bottom with an upturned tip portion, upon which is secured a seat by means of a post or column secured to the ski.

Some of the columns are secured in the middle of the longitudinal axis of ski such as shown in U.S. Pat. No. Des. 93,132 and some are positioned toward the rear of the ski as shown in U.S. Pat. No. Des. 303,416 and 4,722,535. The seat means can be in a plane parallel with the ski though many have seat means where the rear edge of the seat is canted downwardly to compensated for the slope of the hill. Some columns are secured directly to the ski and some utilize brace or support means attached thereto. While most designs just have a seat, U.S. Pat. No. Des. 205,296 incorporates handle bar means and foot peg means to the seat column.

All of these devices suffer from the same problems. The runners are skis, generally narrow and subject to extensive flexing as in a standard ski. These structural attributes are necessary to turn on skis. When a ski is turned on its edges, the ski flexes at the narrow point, forming an arc with the front and rear part of the ski and thus allowing the skis to turn. If the skis were rigid, upon turning, the front and rear edges would contact the snow but the center part would not flex and the ski would not turn. Many ski sleds have been designed with this principle in mind. Further, sleds with runners widened and thickened to avoid flexing can be cumbersome and difficult to carry. The prior art devices are usually provided in one piece being constructed from numerous parts, no allowance being made for knocking down the device for easy storage.

Further, the prior art devices are composed of various pieces that are designed to be secured together by securing means. The prior art devices are not designed to formed in a single piece. The prior art devices if made in a single piece with a flexible ski would be inherently weak. While unitary molding procedures are well known, the prior art structures do not allow for unitary molding using up to date manufacturing conditions using modern plastic materials.

SUMMARY OF THE INVENTION

It has now been found that a single runner ski-sled can be provided wherein the main structure of the ski-sled is adapted to be molded with a vertical parting line wherein substantially all of the device can be formed in one piece wherein the vertical seat supporting column means is integrally molded as part of the overall central member of the ski-sled and not as a separate member. The device has a rigid runner blade that incorporates sufficient strength to allow for blow molding. The device is provided with a seat means that can be easily attached and detached with locking means having sufficient strength to allow the seat means to withstand the pressures of the sliding down a hill but which can be easily removed with light pressure.

The column is uniquely attached to the blade of the ski-sled by a bifurcated vertical member which allows the rider's weight to be evenly distributed for optimum overall performance. Leaning backward significantly weights the rear portion of the ski-sled allowing quicker steering and more speed, leaning forward weights the front portion of the ski-sled allowing straight tracking, more stability and less speed.

BRIEF DESCRIPTION OF THE DRAWINGS

FIG. 3 is a rear view of the single runner ski-sled of the invention.

FIG. 4 is a side elevation of the single runner ski-sled of the invention.

FIG. 5 is a front view of the single runner ski-sled of the invention.

FIG. 6 is a top plan view of the single runner ski-sled of the invention.

FIG. 7 is a bottom plan view of the single runner ski-sled of the invention.

FIG. 8 is a vertical cross-section view showing the seat means in cross-section and its interaction with the main body of the ski-sled in open position.

FIG. 9 is a vertical cross-section view showing the seat means in cross-section and its interaction with the main body of the ski-sled in closed position.

FIG. 10 is a cross-section showing the interaction of the seat means with the seat attachment means.

Figure 1:
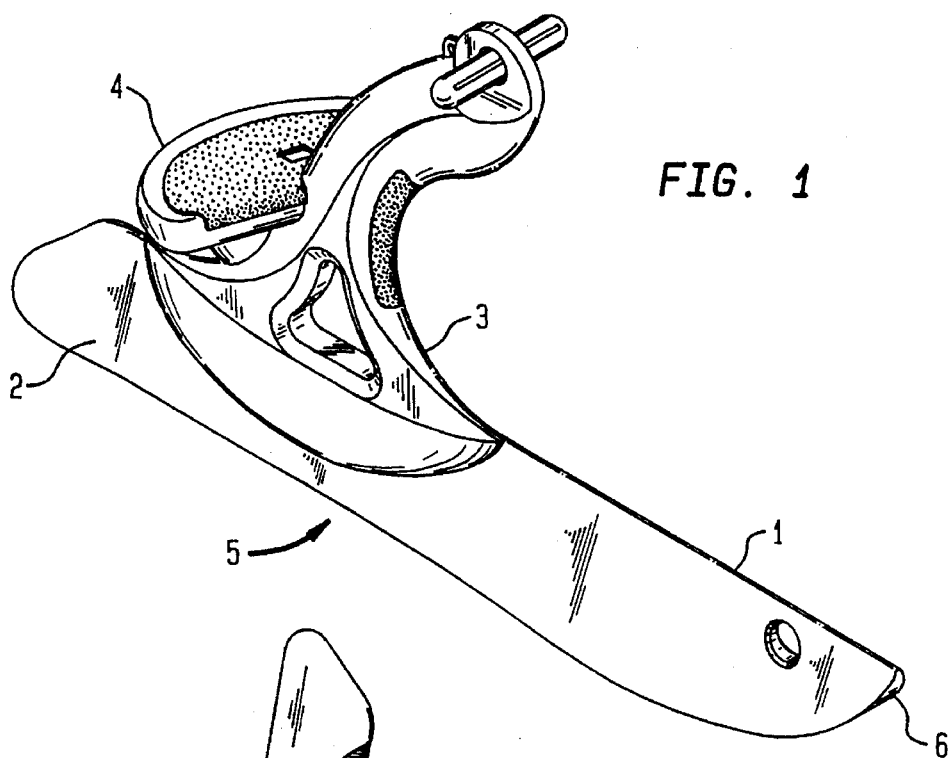
FIG. 1 is a perspective view of the single runner ski-sled constructed in accordance with the invention.

While the preferred form of the invention is illustrated in the drawings, it will be apparent that various modifications can be made without departing from the ambit of the invention.

DETAILED DESCRIPTION OF THE INVENTION

Referring to the accompanying drawings, and particularly FIG. 1, the ski-sled device 1 of the invention is composed of blade member 2, column means 4 having seat means 6 thereon.

The blade means 2 is composed of a bottom runner means 8 that terminates at the front end of the blade means 2 in an upraised tip portion 10. The runner means 8 of blade means 2 can be of uniform width running the length of the runner. Referring to the bottom view of FIG. 7, preferably runner means 8 has a wide width portion 12 at the tip Of the runner means 8 tapering to a narrowed section 14 beneath the seat means 6 of column means 4 and enlarging somewhat at the rear portion 16 of the runner means 8.

The blade is further comprised of upwardly extending side members 18a and 18b that join at the top either to each other or to a top member (not shown). The side members 18a and 18b are preferably joined at their top edges at 20 forming a triangular cross section with the runner means 8 (see rear view of FIG. 3. While a triangular cross-section is preferred for strength, the cross-section of the blade can be trapezoidal or square if desired. The cross-section is of sufficient height to provide the necessary structural strength. Of significance in the invention is the fact that the blade means 2 is rigid; the runner, the upwardly extending sides all combining to make a rigid blade structure. Steering is accomplished by weight shifting. Preferably, the height of the cross-section is greater than the width of the runner. The surfaces of the upwardly extending side members can be flat, concave or convex as desired. While the interior of the blade can be solid, the interior is preferably hollow and, if desired, with chambers and support means especially designed for rigidity and strength while allowing a reduction in weight and material.

Blade means 2 can be embossed with a trademark or other printed material. Due to the triangular shape of the blade, visible writing can be incorporated on the side of device in a predominant position that can be read from the side rather than the top as with a ski.

The rear end of the blade means 22 can be directed in an upwardly and forward direction, the rounded terminus of the runner not digging into the slow and providing a rounded off appearance to the ski-sled.

The runner is preferably incorporated into the central portion of the ski-sled during the molding process of the same material as the remainder of the ski-sled. The runner can also be made of a material different from the remainder of the ski-sled by molding a separate runner into the device. Less desirably, the runner could be secured to the blade by securing means. Metal edges could be included on the runner as gripping edges as are included on skis for the purpose of control.

Optionally, a foot rest can be provided on the front portion of the blade means. Aperture 24 can be used to hold a foot rest means such as a round elongated device inserted into the aperture. Locking means (not shown) can be included at the sides of the blade or internally in the aperture.

Column means 4 are attached to blade means 2 at the top of the blade means. The column is preferably molded, e.g., by blow molding as part of the entire structure. The column could be secured by securing means, such as a slotted adaptor on the top of the blade to allow the column to be detachedly connected to the blade.

The column means 4 is provided with handle bar means 26. The handle means can be an integral part of the column or preferably the column terminates in means allowing a removable detachment of the handle means. For ! this purpose, a handle accepting aperture 28 is provided at the terminus of column means 4. Handle means can be inserted into the handle securing aperture 28 and locked into with locking means (not shown). Such means include external locks, lock nuts or bolts. Preferably, the handle accepting aperture is provided with internal threads and locking means. The handle means is inserted into the handle holding aperture and locked into position by a twisting motion.

The seat means 6 is positioned over the rear portion of the blade. Beneath the seat, column means 4 can be mounted to the blade directly but preferably means 4 column is connected by bifurcated means 30. The two arms 30a and 30b of the bifurcated attachment form a triangular hollow shape 32 with the blade for strength. The bifurcated attachment allows the user to transfer his weight to the rear portion of the runner by leaning backward and to the front by leaning forward. The column extends upwardly and forwardly in a smooth curve to allow for the positioning of the steering means.

Column means 4 is provided with seat attachment means 34 positioned on column means 4 at a functional distance for effective weight transfer for control. The seat attachment means can be secured by securing means to the column but is preferably blow molded as part of the overall structure. The seat attachment means 34 are designed to accept seat means 6, preferably where the seat can be removed for transportation and storage. Of course, the seat means and the seat attachment means can be molded permanently, such as blow-molding, into the ski-sled structure. The seat and seat attachment means can accommodate a motorcycle type seat configuration if desired.

Referring to FIG. 8, seat and means 6 and seat attachment means 34 are designed to interlock in a rattle free tight manner yet can be easily separated for transport and storage. In order to install the seat, hinge pivot 36 is engaged with hinge pivot detent 38. As the seat is rotated downwardly (as at 80), seat interlock 40 engages seat attachment interlock 42 to lock the hinge pivot 36 into the hinge pivot detent 38. Seat means 4 cannot be unhinged without rotating the seat upwardly. The seat channel 42 under seat means 6 begins to matingly engage seat attachment means 34. Channels or mating means 44 and 46 and sides of 48 of seat attachment means 34 are tapered so that as seat is depressed downwardly, the binding between the mating means and the sides of the seat attachment means increases. Channels 50 and 52 perform a similar function so does indents 54 and 56. These are also termed "kiss-offs". The user's weight will force seat means 6 down increasing the binding power.

Latching hole 58 is positioned on seat means 6 with latching ledge 60. Latch means 62 on seat attachment means 34 contacts surface 64 deflecting latch means 62 in a backward direction until latch means 62 locks on latching ledge 60. Because of the leverage created by rotating seat means 6 around hinge pivot 36, the latch means can be locked with significantly low pressure. Once the seat means 6 is locked by latch means 62, the latch means 62 deflects back to its native position, locking seat means 6 in place. Seat means 6 and seat attachment means 34 are wedged together and the seat cannot move down, backward or forward as the two parts are interlocked. The seat cannot move until latch means 62 is depressed backward. Latch means 62 can be designed to use high or low amounts of pressure to deflect the latch. The hinge pivot and the interlocking action between seat means 6 and seat attachment means 34 interlock the seat taking pressure off the latch means whose sole purpose is to keep the seat means from rotating.

The seat means and the seat attachment means interact to direct stress to the Strongest part of the seat post. Weight on the saddle is passed through cones 64 and 66 to the bulge on either side of the seat (68 and 70) and then to two indents 54 and 56 on the side of the seat attachment means. This transfer of stress allows for less wall Weight to be used with the dual benefit of light weight, less material and therefore less cost.

The seat means can be made with a knobby or textured surface for effective non-slip seating. Preferably, the seat can be covered with a covering material with various surface texturings, colors and other design benefits. In order to increase the comfort of the sled, the seat can be padded with a foam of equivalent padding. The purchaser can be provided with a seat covering with or without padding that can be attached by the customer should he so desire. In order to easily secure seat foam to seat member 6, adhesive backing can be provided for adhering the foam to the seat means. In order to facilitate the adhesive securing, a key shape 72 can be molded into the seat member and a matching form cut into the seat covering.

Figure 2:
FIG. 2 is a perspective view showing the ski-sled carrying means of the invention.

The column means 4 has been curved forward at 74 forming a shoulder engaging means that allows the sled to be easily carried on the shoulder with one hand to ease walking up the hill. A texture pad 76 can be attached in the curved portion to increase the comfort at the point of contact with the shoulder (See FIG. 2).

Optionally, safety line means (not shown) can be attached to the ski-sled such as at attachment point 78 on the terminal end of the column means 4.

From the foregoing, it can be seen that the single runner ski-sled of the invention is well adapted for sliding down a slope in a configuration which can be molded, preferably blow molded though any effective molding procedure can be used, in a single piece that is strong enough for the intended use and in which the user can control both the speed and direction of movement of the sled in an easy manner.

What is claimed is:

1. A single runner ski-sled comprising
   a) a rigid elongated runner assembly adapted to slide over a sliding contact surface having an upwardly curving front end, said runner being attached to a runner support means having upwardly extending converging side members forming a substantially triangular or trapezoidal cross-section with said runner,
   b) column means for supporting means seating secured to said runner support means and extending upwardly, and
   c) means for seating secured to the column means above said runner support means, said column means extending above said means for seating and having handle means positioned above said means for seating being curved forward to forward curve which in combination with said runner support means provides shoulder support means for carrying the sled.

2. A single runner ski-sled as described in claim 1, wherein said means for seating is removably secured to said column means.

3. A single runner ski-sled as described in claim 1, wherein said handle means is removably secured to said column means.

4. A single runner ski-sled as described in claim 1, wherein said runner is narrowed in the center versus the ends.

5. A single runner ski-sled as described in claim 1, wherein the rear portion of said means for sealing is tilted in a downwardly direction.

6. A sing runner ski-sled as described in claim 1, wherein said column means is attached to said runner support means with a bifurcated attachment.

7. A single runner ski-sled as described in claim 6, wherein said bifurcated attachment forms a triangular opening with said runner support means.

8. A single runner ski-sled as described in claim 1, wherein said triangular or trapezoidal cross-section has a height at least as large as the width of the runner assembly.

9. Single runner ski-sled as described in claim 1, wherein said shoulder engaging means has textured pad attached thereto.

10. Single runner ski-sled as described in claim 1, wherein said ski-sled is molded.

11. Single runner ski-sled as described in claim 10, wherein said ski-sled is blow molded.

12. Single,runner ski-sled as described in claim 11, wherein said runner means of said blow molded ski-sled is rigid.

13. A single runner ski sled as described in claim 1 wherein the height of the cross-section of said triangular or trapezoidal cross-section is greater than the width of said runner.

* * * * *